UNITED STATES PATENT OFFICE.

CARL FERDINAND FRANZ BRATSCH, OF BERLIN, GERMANY.

POLISHING SUBSTANCE.

SPECIFICATION forming part of Letters Patent No. 582,717, dated May 18, 1897.

Application filed December 24, 1895. Serial No. 573,199. (No specimens.)

*To all whom it may concern:*

Be it known that I, CARL FERDINAND FRANZ BRATSCH, manufacturer, of Prinzenstrasse 73, Berlin, Germany, have invented and discovered certain new and useful Improvements in Polishing Substances, of which the following is a full, clear, and exact description.

For many years it has been unsuccessfully sought to avoid the objectionable oil deposit which appears on polished furniture, especially on the pianos and the like. The failure to obtain this desired end has been due to the fact that hitherto it has been erroneously thought that the oil used in polishing was the cause of this defect. However, I have now discovered that by removing in certain manner the vegetable wax, which is contained in larger quantities in the shellac, these oil deposits disappear. In the action of polishing this vegetable wax becomes intimately combined with the oil and forms a soft viscous or smeary mass, which prevents the polish from becoming properly hardened. The polish is consequently very susceptible to changes in the temperature and also to knocks and friction. This soft viscous or smeary mass, after a longer or shorter interval of time, produces the so-called "oil deposit." This evil will, however, be radically prevented by entirely removing the vegetable wax which is contained in the shellac used for polishing.

The extraction of the vegetable wax may be accomplished by first dissolving shellac in spirit, then adding stick or grain lac to the solution, then filtering the solution, and then addinge thereal oils to the filtrate. The addition of stick or grain lac (*e. g.*, the rosin which exudes from bushes, &c., and which contains much wood fiber, as well as insect-cells, from which the hard shellac is obtained by melting) effects a rapid and complete separation of the vegetable wax from the shellac, a thing which is not possible by simple filtration of the shellac solution without the addition of the grain lac. This effect may be due to the vegetable and animal residue contained in the grain lac.

The shellac solution, freed from vegetable wax, cannot be used for polishing, because, simultaneously with the vegetable wax, the pliant properties necessary for polishing are eliminated. This deficiency is compensated for by the addition of the ethereal oils, which thus replace the vegetable wax in its pliancy and polishing capacity, but do not exhibit the objectionable properties of vegetable wax, such as objectionable exuding of the oil.

The addition of the stick or grain lac to the shellac solution may be accomplished by first making an alcoholic solution of the stick or grain lac and adding it in that form to the solution, or by introducing it in a suitably-divided dry state into the solution and there dissolving it. In this manner there is produced a polish which is hard as glass, is consequently not susceptible to changes in temperature, and is free from all liability of oil-deposit formation. The oil which is used in the polishing may be entirely rubbed or polished away by any skilled polisher, whereas against the above-mentioned viscous or smeary mass as combined with the shellac the polisher is powerless.

A further advantage of my polish without vegetable wax is found in the fact that after the extraction of the vegetable wax the polish consists of absolutely pure lac, and consequently adheres much more readily than the ordinary shellac polish, thus facilitating the polishing considerably. Furthermore, by the use of polish without the vegetable wax the grain and structure of the wood shows more plainly and clearly, whereas the polish at present in use, except under most favorable circumstances, frequently presents an unpleasant clayey or smeared appearance, which, when seen in the sun, appears green, and which may even occur in furniture which is most carefully polished. I therefore attribute such defect also to the vegetable wax contained in the shellac.

There need be absolutely no waste when using my new polish, and therefore this polish will be found more economic and altogether cheaper than any of the shellac polishes now in general use.

The practical composition of this polish may, for example, be as follows: Take twenty-five pounds stick lac, twenty pounds shellac, and four pounds benzoin-gum. This is crushed or ground and then thoroughly dissolved in one hundred pounds alcohol (ninety-five or ninety-six per cent.) and the solution filtered until the vegetable wax is completely extracted, and the solution then left perfectly clear, after which ethereal oils, such as one pound rosemary-oil, are added.

What I claim, and desire to secure by these Letters Patent, is as follows:

1. The manufacture of polish by dissolving shellac in spirit, with the addition of stick or grain lac to the solution, then filtering the solution, and then adding ethereal oils to the filtrate solution, substantially as set forth.

2. The new composition for furniture or other polish, consisting of the admixture of ethereal oils and the filtrate of an alcoholic solution of shellac and stick or grain lac.

In testimony whereof I have hereunto set my hand, at Berlin, Germany, this 3d day of December, 1895.

CARL FERDINAND FRANZ BRATSCH.

Witnesses:
PEREGRINE VARNALS,
KATE STYLES.